(12) United States Patent  (10) Patent No.: US 9,174,319 B2
Dougherty  (45) Date of Patent: Nov. 3, 2015

(54) ILLUMINATED TOOL REST FOR LATHE

(71) Applicant: Michael Dougherty, Jacksonville, NC (US)

(72) Inventor: Michael Dougherty, Jacksonville, NC (US)

( * ) Notice: Subject to any disclaimer, the term of this patent is extended or adjusted under 35 U.S.C. 154(b) by 81 days.

(21) Appl. No.: 13/953,001

(22) Filed: Jul. 29, 2013

(65) Prior Publication Data

US 2014/0123822 A1 May 8, 2014

Related U.S. Application Data

(60) Provisional application No. 61/679,917, filed on Aug. 6, 2012.

(51) Int. Cl.
| | |
|---|---|
| *B23B 5/00* | (2006.01) |
| *B23Q 17/24* | (2006.01) |
| *F21L 2/00* | (2006.01) |
| *B23Q 39/00* | (2006.01) |

(52) U.S. Cl.
CPC ...... *B23Q 17/2404* (2013.01); *B23Q 2039/008* (2013.01); *Y10T 82/2585* (2015.01)

(58) Field of Classification Search
CPC .............. F21V 21/08; B23B 5/00; B23B 5/02
USPC ..................... 82/152; 362/189, 190
See application file for complete search history.

(56) References Cited

U.S. PATENT DOCUMENTS

| | | |
|---|---|---|
| 1,181,261 A | 5/1916 | Schmidt |
| 2,174,827 A | 7/1936 | Latham |
| 2,310,166 A | 2/1943 | Way |
| 2,588,288 A | 2/1948 | Pohanka |
| 2,697,456 A | 12/1954 | Goldschmidt |
| 3,640,321 A | 2/1972 | Walton |
| 3,824,401 A * | 7/1974 | Suzuki ...................... 250/559.4 |
| 4,018,113 A * | 4/1977 | Blazenin et al. ................ 82/118 |
| 4,133,357 A | 1/1979 | Groya et al. |
| 4,227,902 A * | 10/1980 | Olson ............................ 55/302 |
| 4,255,056 A * | 3/1981 | Peterson ....................... 356/401 |
| 4,615,365 A | 10/1986 | Arnall |
| 4,748,571 A * | 5/1988 | Shippy ........................ 700/259 |
| 4,833,782 A | 5/1989 | Smith |
| 4,887,193 A | 12/1989 | Dieckmann |
| 5,224,529 A | 7/1993 | Kenny |
| 5,392,122 A * | 2/1995 | Ulanov et al. ................. 356/626 |
| 5,500,989 A * | 3/1996 | Ford et al. ..................... 29/27 R |
| 5,597,495 A * | 1/1997 | Keil et al. ....................... 216/66 |
| 5,653,273 A | 8/1997 | Bach |
| 5,992,482 A | 11/1999 | Voisey |
| 6,000,447 A | 12/1999 | Clay |
| 6,561,062 B2 | 5/2003 | Miller |
| 6,616,295 B2 | 9/2003 | Sako et al. |
| 6,951,408 B2 * | 10/2005 | Stewart ......................... 362/183 |
| 7,101,058 B2 | 9/2006 | Prell et al. |
| 7,874,234 B2 | 1/2011 | Clay |
| 8,047,106 B2 | 11/2011 | Chang |
| 8,104,913 B2 | 1/2012 | Wright |
| 2006/0077656 A1* | 4/2006 | Huang ............................ 362/189 |
| 2006/0203469 A1 | 9/2006 | Niemann |
| 2010/0085730 A1 | 4/2010 | Chen et al. |

* cited by examiner

Primary Examiner — Will Fridie, Jr.
(74) *Attorney, Agent, or Firm* — MacCord Mason PLLC

(57) ABSTRACT

A lathe tool rest including a light source for improving the illumination of the workpiece is described. The tool rest includes a vertical post having an upper end, a horizontal tool arm attached to the upper end of the post, and an LED illumination strip attached to the front side of the tool arm. The front side of the tool arm preferably includes a horizontal recess With the LED illumination strip being mounted within the recess.

19 Claims, 3 Drawing Sheets

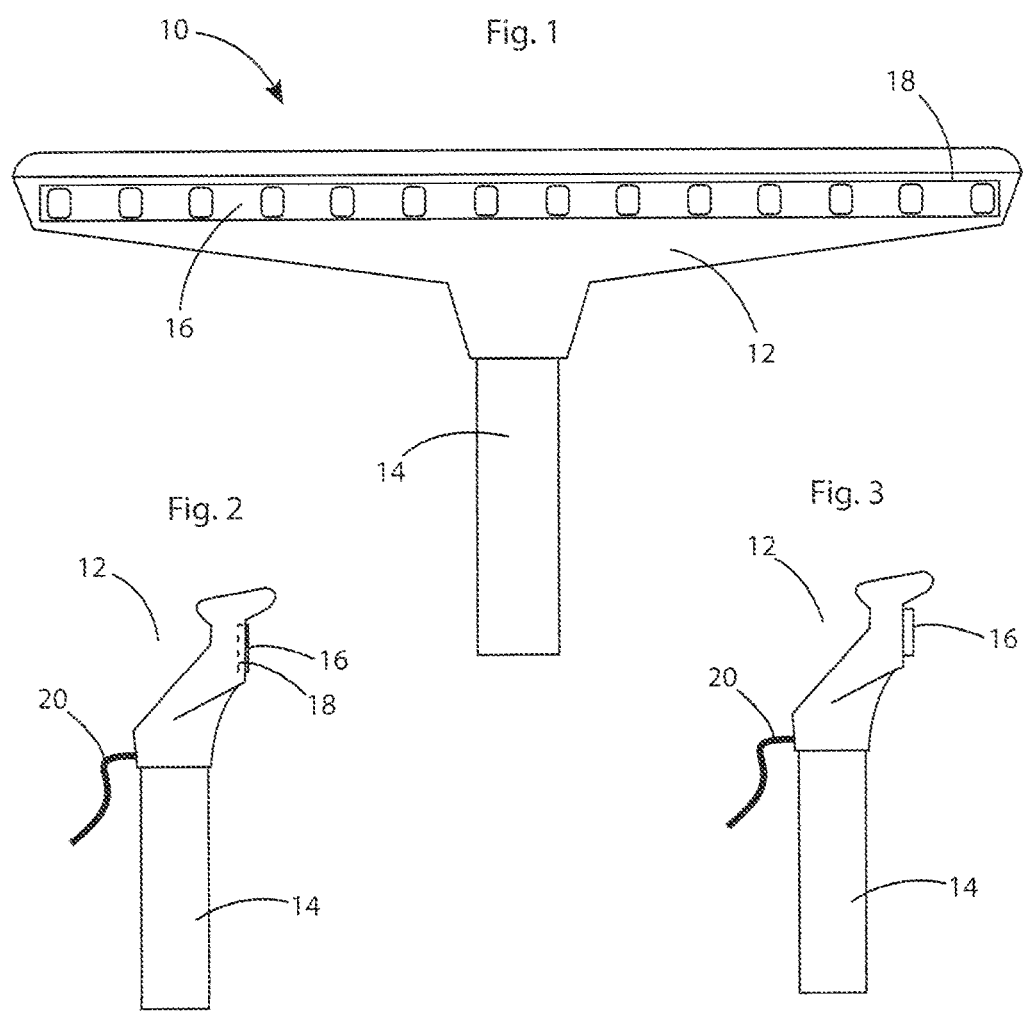

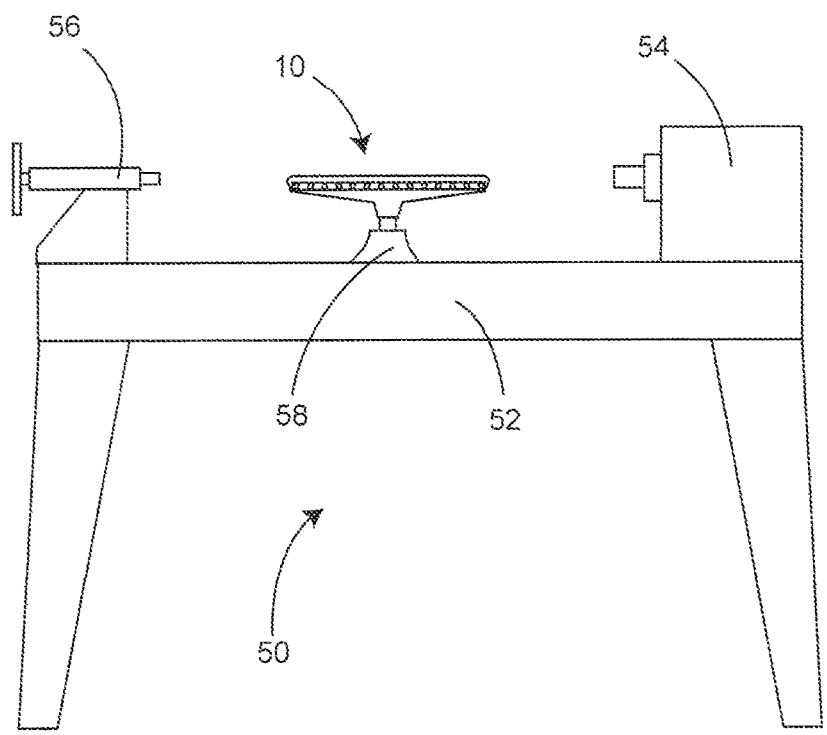

ILLUMINATED TOOL REST FOR LATHE

This application claims the benefit of the filing date of U.S. patent application Ser. No. 61/679,917, filed Aug. 6, 2012, which is incorporated herein in its entirety.

BACKGROUND OF THE INVENTION (1) Field of the Invention

The present invention relates generally to tool rests for lathes and in particular to a lathe tool rest having an illumination source mounted on the tool rest.

(2) Description of the Prior Art

Lathes are tools used to remove material from a workpiece by holding a cutting tool against the workpiece as the workpiece is rotated. The workpiece is most commonly wood, but may be metal, plastic or other material. Generally, the lathe is comprised of a bed with bed rails, a headstock with a rotatable horizontal spindle fixed or slidably mounted at one end of the bed rails, a tailstock with a tailstock barrel slidably mounted at the opposite end of the bed rails, and a tool rest mounted between the headstock and the tailstock.

Generally, the tool rest is mounted on a saddle, also known as a banjo, that is slidable on the bed rails and also adjustable inwardly and outwardly. The tool rest is comprised of a vertical post that is inserted into a recess in the saddle and a horizontal tool arm that is mounted on the top end of the post. The post is vertically adjustable to raise and lower the tool arm to the desired position, which is usually approximately in a plane with or slightly below the point at which the cutting tool engages the workpiece.

In use, the workpiece is mounted on the headstock, and on the tailstock if needed. The tool rest horizontal arm is placed close to, e.g., about one-half inch away, from the path of the workpiece surface. The cutting tool is then held against the upper surface of the tool rest arm and the tip of the tool is then moved into engagement with the workpiece, thereby cutting, chipping or scraping away pieces of the workpiece to round the workpiece to the desired shape.

Viewing of the workpiece, in particular the area being contacted by the cutting tool, is generally with the benefit of overhead room lighting. However, additional lighting is often provided by lights that are positioned in the vicinity of the lathe, e.g., clamp-on or magnetically attached lamps with flexible or articulating arms. However, these prior art lighting means often do not provide adequate lighting, particularly when detailed cutting is being done, or when the cutting is inside a workpiece recess, such as the inside of a bowl. In addition, the light may interfere with the operator's access. Therefore, there is a continuing need for a means for better lighting a lathe and workpiece during cutting of the workpiece.

SUMMARY OF THE INVENTION

The present invention addresses this need by providing an improved tool rest that has a light source attached to or built into the tool rest. More specifically, the present invention is directed to a modified lathe tool rest that has a front side, i.e., the side of the tool rest that is toward the workpiece when the tool rest is mounted on the lathe for use, a rear side and an upper tool surface. Various prior art tool rests are suitable for modification, including tool rests with straight front sides, and tool rests with curved front sides.

In accordance with the present invention, the tool rest is modified by the addition of a light source to the tool rest front surface. The preferred light source is an LED strip as described herein. However, while the invention will be described in the context of an LED strip, it is understood that other low profile, low voltage, direct current light sources, such as halogen lights, are contemplated by the present invention.

The LED strip may be attached to the front surface, or the front surface may preferably include a recess into which the LED strip is inserted. The LED strip preferably extends along the entire front surface, but can be shorter than the length of the front surface, if desired.

LED strips used in the present invention are commercially available LED strips that can be purchased from one of several Internet suppliers. These strips are normally sold in a roll that may be several feet in length and are designed so that the purchaser can cut off the desired length from the strip. The end of the LED strip segment can then be attached, e.g., by a solderless connector, to a source of electricity. For greatest visibility, the LED lights are preferably white.

LED lights are normally powered by a 12V power source. While a battery may be used for the purpose, power is usually obtained for a 110V AC power source, e.g, a wall outlet, through an AC/DC transformer. Transformers for this use are readily available commercially. An on/off switch will usually be included in the circuit. To keep wiring out of the work area, electrical wiring from the LED strip preferably extends through a hole or slot in the tool rest so that the electrical wire extends out of the rear surface of the tool rest.

BRIEF DESCRIPTION OF THE DRAWINGS

FIG. 1 is a front view of one type of tool rest with an LED light strip secured to the front surface of the tool rest arm.

FIG. 2 is a side view of the tool rest of FIG. 1 with the LED strip mounted in a recess in the front surface of the tool rest arm.

FIG. 3 is a side view of a tool rest of the same type as shown in FIGS. 1 and 2, but with the LED strip mounted on the front surface of the tool rest arm.

FIG. 6 is a front view of a lathe including the tool rest.

DETAILED DESCRIPTION OF THE INVENTION

Figure 4:
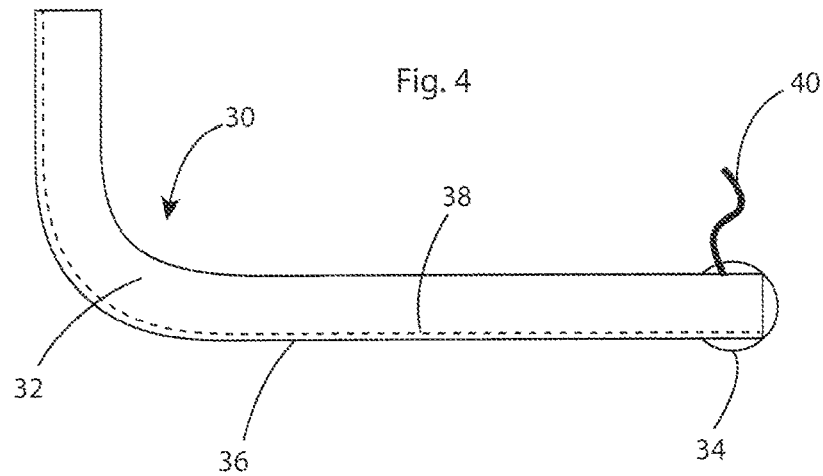
FIG. 4 is a top view of another type of tool rest with an LED light strip secured within a recess in the front surface of the tool rest arm.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Numerous tool rest designs are used with lathes depending on the work to be performed. It Neill be understood that the present invention is applicable to all tool rest configurations, the only requirement being that the tool rest includes a front surface upon which an LED light source large enough to provide the desired illumination can be mounted. The tool rest may be sold as new equipment or as a retrofit to existing lathes.

The accompanying drawings are intended to illustrate two tool rest designs upon which the LED strip is attached. It will be understood that the shape of the tool rest is not critical to the invention, and that the light strip can be attached to the front surface of a wide variety of tool rests.

FIGS. 1-3 illustrate a first type of tool rest, generally 10. comprised of a straight tool rest arm 12 supported on post 14.

FIGS. 1 and 2 illustrate modification of this type of tool rest by attachment of LED strip 16 within horizontal recess 18. Alternatively, strip 16 can be mounted on the front surface of arm 12 as shown in FIG. 3. Strip 16 can be attached to arm 12 by various known means, such as fasteners, but will normally be attached with adhesive. Preferably, strip 16 extends substantially the width of arm 12. It will be understood, however, that a shorter LED strip is also contemplated. Strip 16 is connected to an electrical power source, not shown, by wire 20.

Figure 5:
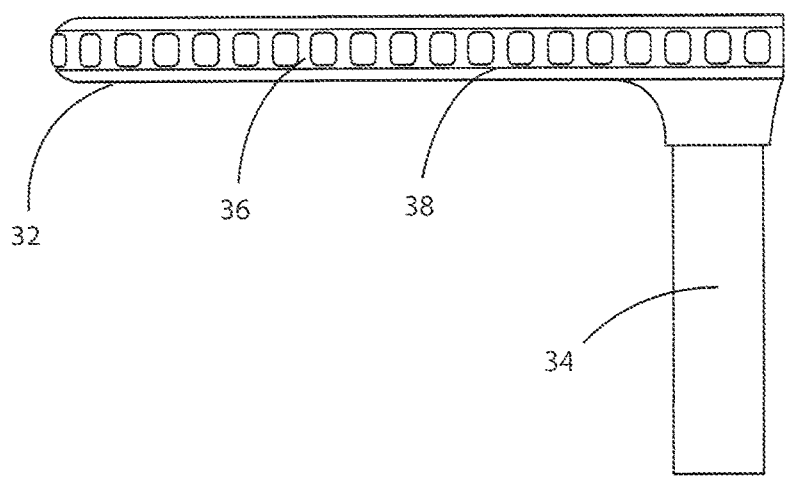
FIG. 5 is a front view of the tool rest of FIG. 4.

FIGS. 4-5 illustrate another tool rest, generally 30, having a curved arm 32 with a round cross-section mounted on post 34. LED strip 36 is mounted within recess 38 and connected to an electrical power source via wire 40.

FIG. 6 illustrates tool rest 10 mounted on a wood lathe, generally 50. Lathe 50 includes a bed 52, a headstock 54, a tailstock 56, and a saddle or banjo 58.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A tool rest for a lathe comprising:
   a) a vertical support member having a lower end and an upper end, said lower end configured to be inserted into a recess on a saddle of a lathe;
   b) a horizontal tool arm attached to the upper end of said support member, said tool arm including an upper surface adapted for receiving a cutting tool, a front side and a rear side; and
   c) a light source attached to the front side of said tool arm, wherein the lower end of the vertical support member is configured to be mounted to the lathe so that when a user places a cutting tool on the upper surface of the horizontal tool arm the cutting tool can reach a workpiece mounted in the lathe.

2. The tool rest of claim 1, wherein said light source is an LED strip.

3. The tool rest of claim 1, wherein said tool arm is curved.

4. The tool rest of claim 1, wherein said tool arm front face includes a recess and said light source is mounted in said recess.

5. The tool rest of claim 1, wherein said tool rest includes a front side and a back side, and said light source includes a power cord extending from said light source to the back side of said tool rest.

6. The tool rest of claim 1, wherein said light source extends the length of the front face of said tool arm.

7. A tool rest for a lathe comprising:
   a) a vertical support member having a lower end configured to engage a banjo or saddle of a lathe and an upper end;
   b) a horizontal tool arm attached to the upper end of said support member, said tool arm including an upper surface adapted for receiving a cutting tool, a front side and a rear side; and
   c) an LED illumination strip attached to the front side of said tool arm,
   wherein the lower end of the vertical support member is configured to be mounted on a saddle or banjo of a lathe so that when a user places a cutting tool on the upper surface of the horizontal tool arm the cutting tool can contact a workpiece mounted in the lathe, and the LED illumination strip can illuminate the workpiece from the same side as the workpiece is contacted by the cutting tool.

8. The tool rest of claim 7, wherein the lower end of said support member is configured to be mounted into a recess on a saddle of a lathe.

9. The tool rest of claim 8, wherein the height of said support member is adjusted by vertically sliding the support member within the recess of the saddle of the lathe.

10. The tool rest of claim 7, wherein said tool arm front face includes a recess and said LED strip is mounted in said recess.

11. The tool rest of claim 7, wherein said tool rest includes a front side and a back side, and said LED strip includes a power cord extending from said light source to the back side of said tool rest.

12. The tool rest of claim 7, wherein said LED strip extends the length of the front face of said tool arm.

13. The tool rest of claim 7, wherein said LED strip is shorter than the length of said tool rest front surface.

14. A tool rest for a lathe comprising:
   a) a vertical support member having a lower end and an upper end, the lower end configured to be inserted into a hole of a saddle of a lathe;
   b) a horizontal tool arm attached to the upper end of said support member, said tool arm including an upper surface adapted for receiving a cutting tool, a front side with a recess and a rear side; and
   c) an LED illumination strip in the recess in the front side of said tool arm,
   wherein the vertical support member is configured to be vertically slidable within the hole of the saddle of the lathe in order to adjust the height of said support member with respect to a workpiece mounted in the lathe so that when a user places a cutting tool on the upper surface of the horizontal tool arm the cutting tool can contact the workpiece, and the LED illumination strip can illuminate the workpiece from the same side as the workpiece is contacted by the cutting tool.

15. The tool rest of claim 14, wherein said support member is a cylindrical post.

16. The tool rest of claim 14, wherein said tool arm is curved.

17. The tool rest of claim 14, wherein said tool rest includes a front side, a back side, and a hole extending from the front side to the back side of said tool rest, said LED strip including a power cord extending through said hole.

18. The tool rest of claim 14, wherein said LED strip extends the length of the front face of said tool arm.

19. The tool rest of claim 14, wherein said LED strip is attached in said recess with adhesive.

* * * * *